(12) United States Patent
Zhang et al.

(10) Patent No.: US 7,875,396 B2
(45) Date of Patent: Jan. 25, 2011

(54) MEMBRANE HUMIDIFIER FOR A FUEL CELL

(75) Inventors: Yan Zhang, Victor, NY (US); Annette M. Brenner, Honeoye Falls, NY (US); Hubert A. Gasteiger, Rochester, NY (US); Steven G. Goebel, Victor, NY (US); Glenn W. Skala, Churchville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1245 days.

(21) Appl. No.: 11/478,446

(22) Filed: Jun. 29, 2006

(65) Prior Publication Data

US 2008/0001313 A1 Jan. 3, 2008

(51) Int. Cl.
*H01M 8/02* (2006.01)
*B01D 47/00* (2006.01)
(52) U.S. Cl. .................. 429/413; 429/456; 429/457; 429/514; 261/100
(58) Field of Classification Search ............. None
See application file for complete search history.

(56) References Cited

U.S. PATENT DOCUMENTS

| | | | |
|---|---|---|---|
| 4,604,331 | A | 8/1986 | Louis |
| 6,171,374 | B1 | 1/2001 | Barton et al. |
| 6,284,399 | B1 | 9/2001 | Oko et al. |
| 6,471,195 | B2 | 10/2002 | Shimanuki et al. |
| 6,777,126 | B1 | 8/2004 | Allen |
| 6,783,878 | B2 | 8/2004 | Voss et al. |
| 6,864,005 | B2 | 3/2005 | Mossman |
| 6,960,404 | B2 | 11/2005 | Goebel |
| 2004/0013931 | A1 | 1/2004 | Takamura et al. |
| 2004/0137309 | A1 | 7/2004 | Allen et al. |
| 2005/0042494 | A1 | 2/2005 | Yuh et al. |
| 2008/0311459 | A1* | 12/2008 | Goebel et al. ............. 429/34 |

FOREIGN PATENT DOCUMENTS

CN 1399804 A 2/2003

* cited by examiner

*Primary Examiner*—Dah-Wei Yuan
*Assistant Examiner*—Angela J. Martin
(74) *Attorney, Agent, or Firm*—Fraser Clemens Martin & Miller LLC; J. Douglas Miller (57) ABSTRACT

A membrane humidifier for a fuel cell is disclosed, wherein a pressure drop in the humidifier is minimized and a humidification of a proton exchange membrane in the fuel cell is optimized.

15 Claims, 5 Drawing Sheets

MEMBRANE HUMIDIFIER FOR A FUEL CELL

FIELD OF THE INVENTION

The invention relates to a fuel cell and more particularly to a membrane humidifier for a fuel cell.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which directly combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion media (hereinafter "DM's") or diffusion layers that are formed from a resilient, conductive, and gas permeable material such as carbon fabric or paper. The DM's serve as the primary current collectors for the anode and cathode, as well as provide mechanical support for the MEA. Alternatively, the DM may contain the catalyst layer and be in contact with the membrane. The DM's and MEA are pressed between a pair of electronically conductive plates which serve as secondary current collectors for collecting the current from the primary current collectors. The plates conduct current between adjacent cells internally of the stack in the case of bipolar plates and conduct current externally of the stack (in the case of monopolar plates at the end of the stack).

The secondary current collector plates each contain at least one active region that distributes the gaseous reactants over the major faces of the anode and cathode. These active regions, also known as flow fields, typically include a plurality of lands which engage the primary current collector and define a plurality of grooves or flow channels therebetween. The channels supply the hydrogen and the oxygen to the electrodes on either side of the PEM. In particular, the hydrogen flows through the channels to the anode where the catalyst promotes separation into protons and electrons. On the opposite side of the PEM, the oxygen flows through the channels to the cathode where the oxygen attracts the hydrogen protons through the PEM. The electrons are captured as useful energy through an external circuit and are combined with the protons and oxygen to produce water vapor at the cathode side.

Many fuel cells use internal membranes, such as the PEM type fuel cell which includes proton exchange membranes, also referred to as polymer electrolyte membranes. In order to perform within a desired efficiency range, it is desirable to maintain the membranes in a moist condition. Therefore, it is necessary to provide a means for maintaining the fuel cell membranes in the moist condition. This helps avoid damage to or a shortened life of the membranes, as well as to maintain the desired efficiency of operation. For example, lower water content of the membrane leads to a higher proton conduction resistance, thus resulting in a higher ohmic voltage loss. The humidification of the feed gases, in particular the cathode inlet, is desirable in order to maintain sufficient water content in the membrane, especially in the inlet region. Humidification in a fuel cell is discussed in commonly owned U.S. patent application Ser. No. 10/797,671 to Goebel et al.; commonly owned U.S. patent application Ser. No. 10/912,298 to Sennoun et al.; and commonly owned U.S. patent application Ser. No. 11/087,911 to Forte, each of which is hereby incorporated herein by reference in its entirety.

To maintain a desired moisture level, an air humidifier is frequently used to humidify the air stream used in the fuel cell. The air humidifier normally consists of a round or box type air humidification module that is installed into a housing of the air humidifier. Examples of this type of air humidifier are shown and described in U.S. patent application Ser. No. 10/516,483 to Tanihara et al., hereby incorporated herein by reference in its entirety, and U.S. Pat. No. 6,471,195, hereby incorporated herein by reference in its entirety.

Membrane humidifiers have also been utilized to fulfill fuel cell humidification requirements. For the automotive fuel cell humidification application, such a membrane humidifier needs to be compact, exhibit low pressure drop, and have high performance characteristics.

Designing a membrane humidifier requires a balancing of mass transport resistance and pressure drop. To transport from wet side to dry side through a membrane, water molecules must overcome some combination of the following resistances: convectional mass transport resistance in the wet and dry flow channels; diffusion transport resistance through the membrane; and diffusion transport resistance through the membrane support material. Compact and high performance membrane humidifiers typically require membrane materials with a high water transport rate (i.e. GPU in the range of 10000-12000). GPU or gas permeation unit is a partial pressure normalized flux where $1\ \text{GPU}=10^{-6}\ \text{cm}^3\ (\text{STP})/(\text{cm}^2\ \text{sec}\ \text{cm Hg})$. As a result, minimizing the transport resistance in the wet and dry flow channels and the membrane support material becomes a focus of design.

It would be desirable to produce a membrane humidifier for a fuel cell, wherein a mass transport resistance and a pressure drop are minimized.

SUMMARY OF THE INVENTION

Consistent and consonant with the present invention, a membrane humidifier for a fuel cell, wherein a mass transport resistance and a pressure drop are minimized, has surprisingly been discovered.

In one embodiment, the membrane humidifier for a fuel cell comprises a substantially planar first plate having at least one substantially linear flow channel formed therein, the flow channel of the first plate adapted to facilitate a flow of a first gas therethrough; a substantially planar second plate having at least one substantially linear flow channel formed therein, the flow channel of the second plate adapted to facilitate a flow of a second gas therethrough, wherein the flow channel of the first plate is substantially perpendicular to the flow channel of the second plate; a diffusion medium disposed between the first plate and the second plate, the diffusion medium adapted to permit a transfer of water vapor therethrough; and a membrane disposed between the first plate and the second plate, the membrane adapted to permit a transfer of water vapor therethrough, wherein water vapor in the first gas is transferred through the diffusion medium and the membrane to the second gas.

In another embodiment, the membrane humidifier for a fuel cell comprises a wet side plate having a plurality of flow channels formed therein, the flow channels of the wet side plate adapted to facilitate a flow of a wet gas therethrough; a dry side plate having a plurality of flow channels formed therein, the flow channels of the dry side plate adapted to facilitate a flow of a dry gas therethrough, wherein the flow channels of the wet side plate create a cross-flow pattern with the flow channels of the dry side plate; a first diffusion medium disposed between the wet side plate and the dry side plate adjacent the wet side plate, the first diffusion medium adapted to permit a transfer of water vapor therethrough; a second diffusion medium disposed between the wet side plate and the dry side plate adjacent the dry side plate, the second diffusion medium adapted to permit a transfer of water vapor therethrough; and a membrane disposed between the first diffusion medium and the second diffusion medium, the membrane adapted to permit a transfer of water vapor therethrough, wherein water vapor in the wet gas is transferred through the first diffusion medium, the membrane, and the second diffusion medium to the dry gas.

In another embodiment, the membrane humidifier for a fuel cell comprises a plurality of wet side plates having a plurality of flow channels formed therein, the flow channels of the wet side plates adapted to facilitate a flow of a wet gas therethrough; a plurality of dry side plates having a plurality of flow channels formed therein, the flow channels of the dry side plates adapted to facilitate a flow of a dry gas therethrough, wherein the flow channels of the wet side plates create a cross-flow pattern with the flow channels of the dry side plates; a plurality of first diffusion media, one of the first diffusion media disposed between each of the wet side plates and the dry side plates adjacent the wet side plates, the first diffusion media adapted to permit a transfer of water vapor therethrough; a plurality of second diffusion media, one of the second diffusion media disposed between each of the wet side plates and the dry side plates adjacent the dry side plates, the second diffusion media adapted to permit a transfer of water vapor therethrough; and a membrane disposed between each of the first diffusion media and the second diffusion media, the membrane adapted to permit a transfer of water vapor therethrough, wherein water vapor in the wet gas is transferred through the first diffusion media, the membrane, and the second diffusion media to the dry gas.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
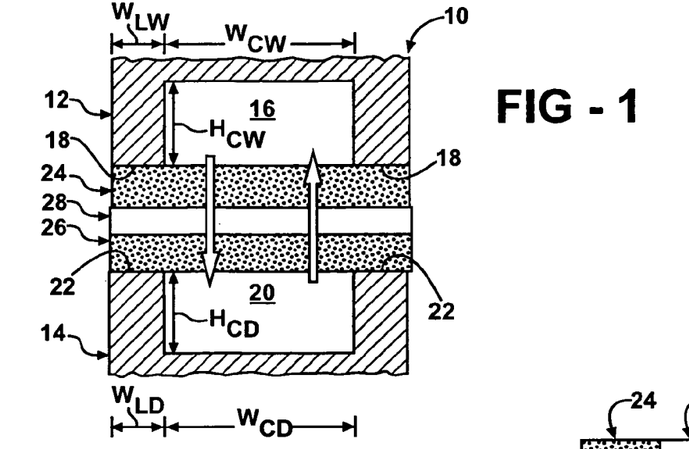
FIG. 1 is a schematic view of a portion of a membrane humidifier assembly according to an embodiment of the invention and showing a section of wet plate flow channel and a dry plate flow channel.

FIG. 1 illustrates a membrane humidifier assembly 10 for a fuel cell (not shown) according to an embodiment of the invention. The membrane humidifier assembly 10 includes a wet plate 12 and a dry plate 14. For the embodiment shown and described herein, the membrane humidifier assembly 10 for a cathode side of the fuel cell is described. However, it is understood that the membrane humidifier assembly 10 can be used for an anode side of the fuel cell or otherwise as desired.

The wet plate 12 includes a plurality of flow channels 16 formed therein. The channels 16 are adapted to convey a wet gas from the cathode of the fuel cell to an exhaust (not shown). In the embodiment shown, the channels 16 include a width $W_{CW}$ and a depth $H_{CW}$. A land 18 is formed between adjacent channels 16 in the wet plate 12. The land 18 includes a width $W_{LW}$. Any conventional material can be used to form the wet plate 12 such as steel, polymers, and composite materials, for example.

The dry plate 14 includes a plurality of flow channels 20 formed therein. The channels 20 are adapted to convey a dry gas from a source of gas (not shown) to the cathode of the fuel cell. As used herein, wet gas means a gas such as air and gas mixtures of O2, N2, H2O, H2, for example, including water vapor and/or liquid water therein at a level above that of the dry gas. Dry gas means a gas such as air and gas mixtures of $O_2$, $N_2$, $H_2O$, and $H_2$, for example, absent water vapor or including water vapor and/or liquid water therein at a level below that of the wet gas. It is understood that other gases or mixtures of gases can be used as desired. In the embodiment shown, the channels 20 include a width $W_{CD}$ and a depth $H_{CD}$. A land 22 is formed between adjacent channels 20 in the dry plate 14. The land 22 includes a width $W_{LD}$. Any conventional material can be used to form the dry plate 14 such as steel, polymers, and composite materials, for example.

A diffusion medium or diffusion layer 24 is disposed adjacent the wet side plate 12 and abuts the lands 18 thereof. Similarly, a diffusion medium or diffusion layer 26 is disposed adjacent the dry side plate 14 and abuts the lands 22 thereof. The diffusion media 24, 26 are formed from a resilient and gas permeable material such as carbon fabric, paper, and glass fiber for example.

Figure 2:
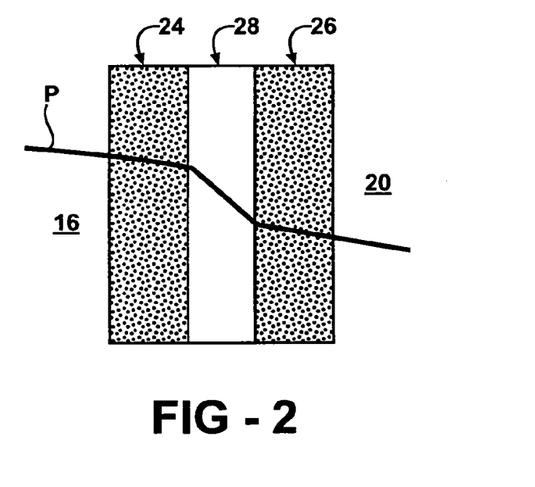
FIG. 2 is a graphical representation of water partial pressure distribution throughout the membrane humidifier assembly illustrated in FIG. 1.

A membrane 28 is disposed between the diffusion medium 24 and the diffusion medium 26. The membrane 28 can be any conventional membrane such as perfluorosulfonic acid (PFSA) such as sold under the trademark Nafion®, hydrophilic polymer membranes, and polymer composite membranes, for example. For a compact fuel cell humidifier application, it is typically desirable for the membrane 28 to have a permeance of greater than 8000 GPU, and typically in the range of 10000-12000 GPU FIG. 2 shows a schematic representation of the membrane humidifier assembly 10 including the channels 16, the diffusion medium 24, the membrane 28, the diffusion medium 26, and the channels 20 with a graphical representation of water partial pressure across the membrane humidifier assembly 10. A molecular transport of water from the wet side channel 16 to the dry side channel 20 includes several transport modes. A convection mass transport of water vapor occurs in the channels 16, 20. A diffusion transport occurs through the diffusion media 24, 26. Water vapor is also transported by diffusion through the membrane 28. Additionally, if a pressure differential exists between the channels 16 of the wet side plate 12 and the channels 20 of the dry side plate 14, water is transferred through the membrane 28 by hydraulic forces. Temperature differences between the channels 16 of the wet side plate 12 and the channels 20 of the dry side plate 14 may also affect the transport of water therebetween. There is also an enthalpy exchange between the channels 16 of the wet side plate 12 and the channels 20 of the dry side plate 14. The line P in FIG. 2 shows the water partial pressure distribution throughout the membrane humidifier assembly 10.

For each step of the transport of water from the wet side channel 16 to the dry side channel 20, the water flux can be calculated. For water transport in the channels 16, 20:

$$N_{H_2O} = \frac{(P_{H_2O,ch} - P_{H_2O,ch/dm})}{R \times T} \times \frac{Sh \times D_{H_2O-m}}{H_c}$$

Where:
$D_{H_2O-m}$: diffusivity of water vapor in gas mixture (m² sec)
$H_c$: channel depth (m)
$N_{H_2O}$: water diffusion flux through membrane (mole/m² sec)
$P_{H_2O}$: water partial pressure (Pa)
R: ideal gas cons tan t
Sh: Sherwood Number
T: temperatur e(K)

For water transport through the diffusion media 24, 26:

$$N_{H_2O} = \frac{(P_{H_2O,ch/dm} - P_{H_2O,dm/memb})}{R \times T} \times \frac{D_{H_2O-m} \times \varepsilon}{d \times \tau}$$

Where:
d: diffusion media thickness (m)
ε: diffusion media porosity
τ: diffusion media tortuosity For water transport through the membrane 28 (a perfluorosulfonic acid membrane is used for purposes of illustration):

$$N_{H_2O} = \frac{\rho_m}{EW} \times \frac{D_{h2o,memb}}{\delta_m} \times (\lambda_w - \lambda_d) \times 10000.$$

Where:
EW: equivalent weight of membrane (gm Nafion/mole $SO_3H$)
ρm: density of membrane (gm Nafion/cm³)
$D_{h2o,memb}$: diffusivity of water in the membrane (cm²/sec)
$\delta_m$: thickness of the membrane (cm)
λ: water uptake (mole $H_2O$/mole $SO_3H$)

Figure 3:
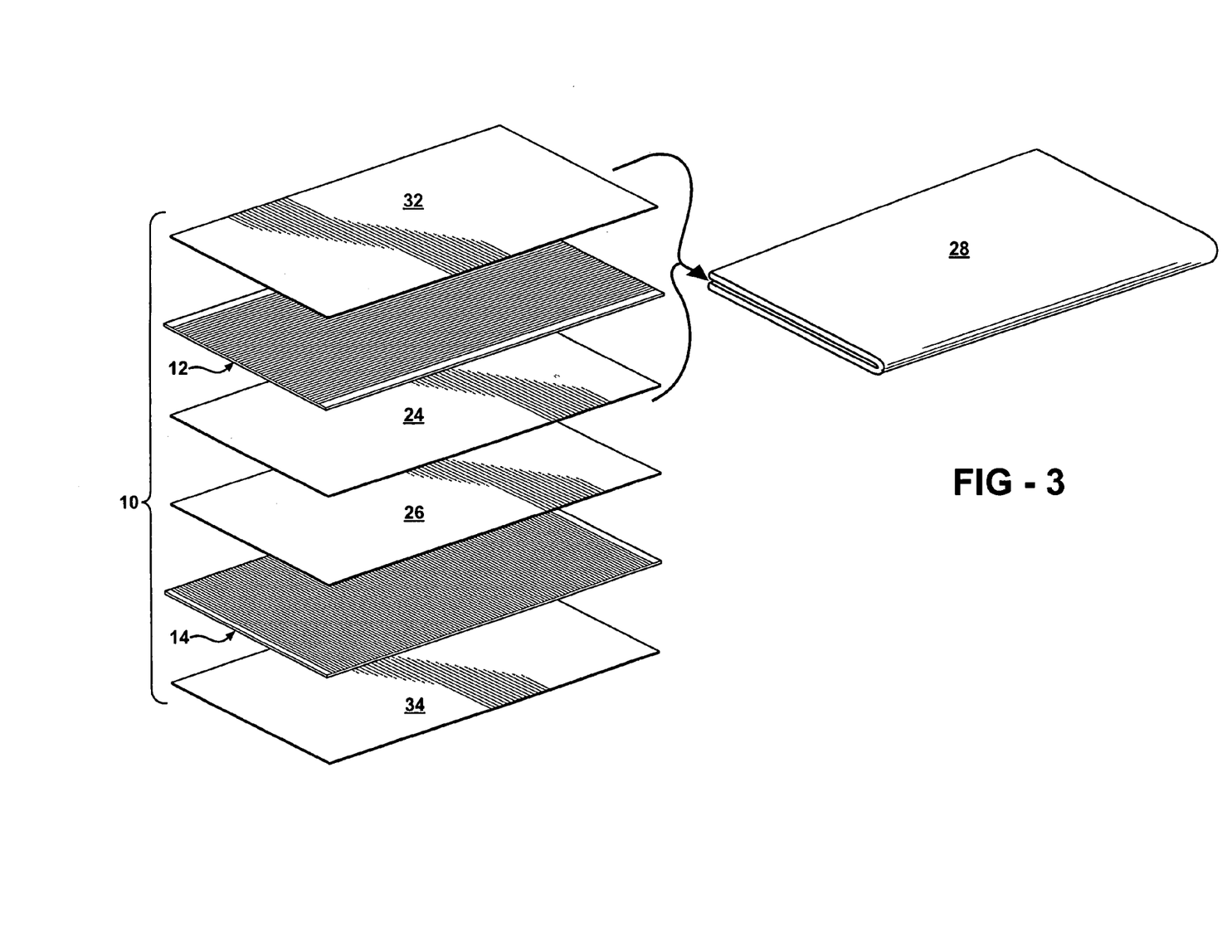
FIG. 3 is an exploded perspective view of the membrane humidifier assembly illustrated in FIG. 1.
Figure 4:
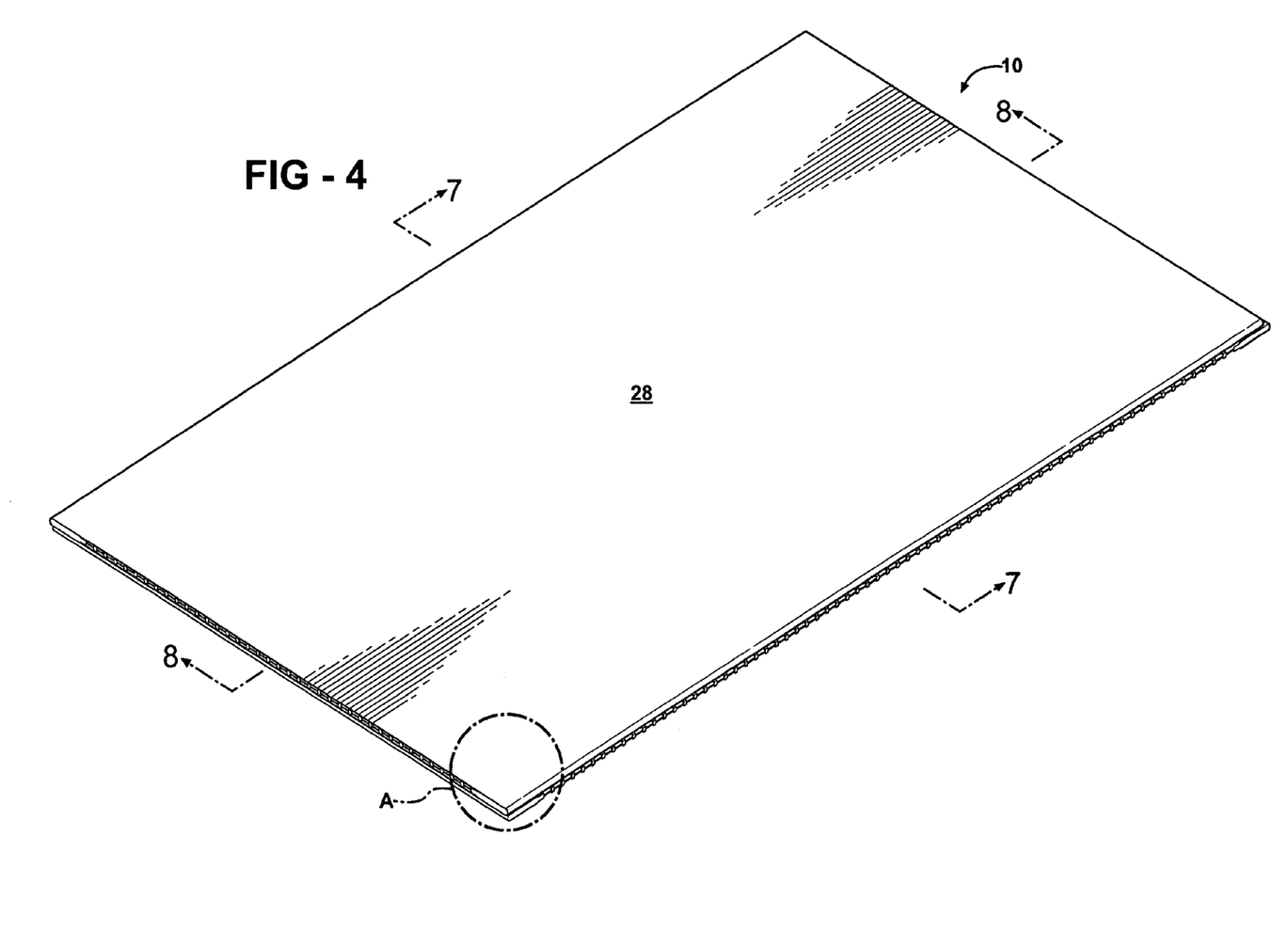
FIG. 4 is a perspective view of the membrane humidifier assembly illustrated in FIGS. 1 and 3.
Figure 5:
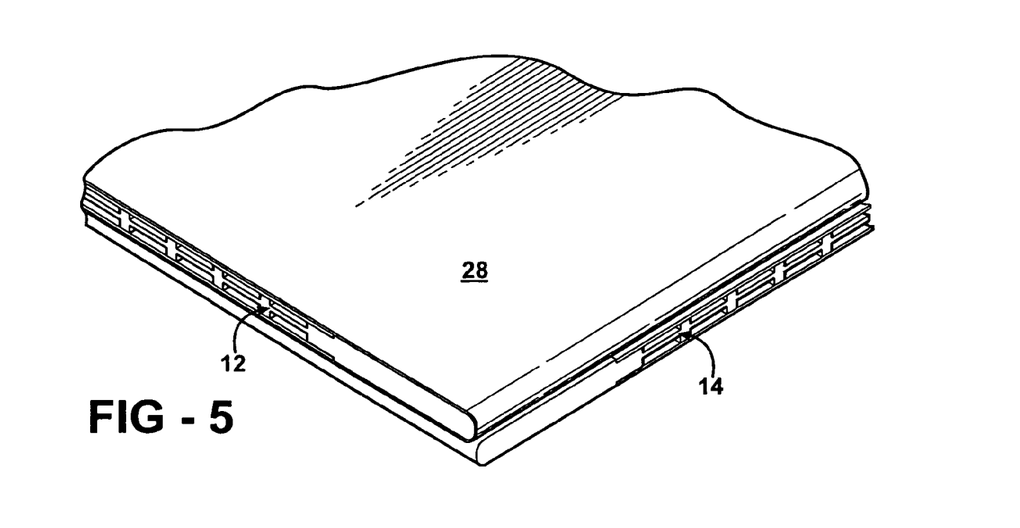
FIG. 5 is an enlarged partial perspective view of a corner portion of the membrane humidifier assembly indicated by circle A in FIG. 4.
Figures 6, 9, 10:
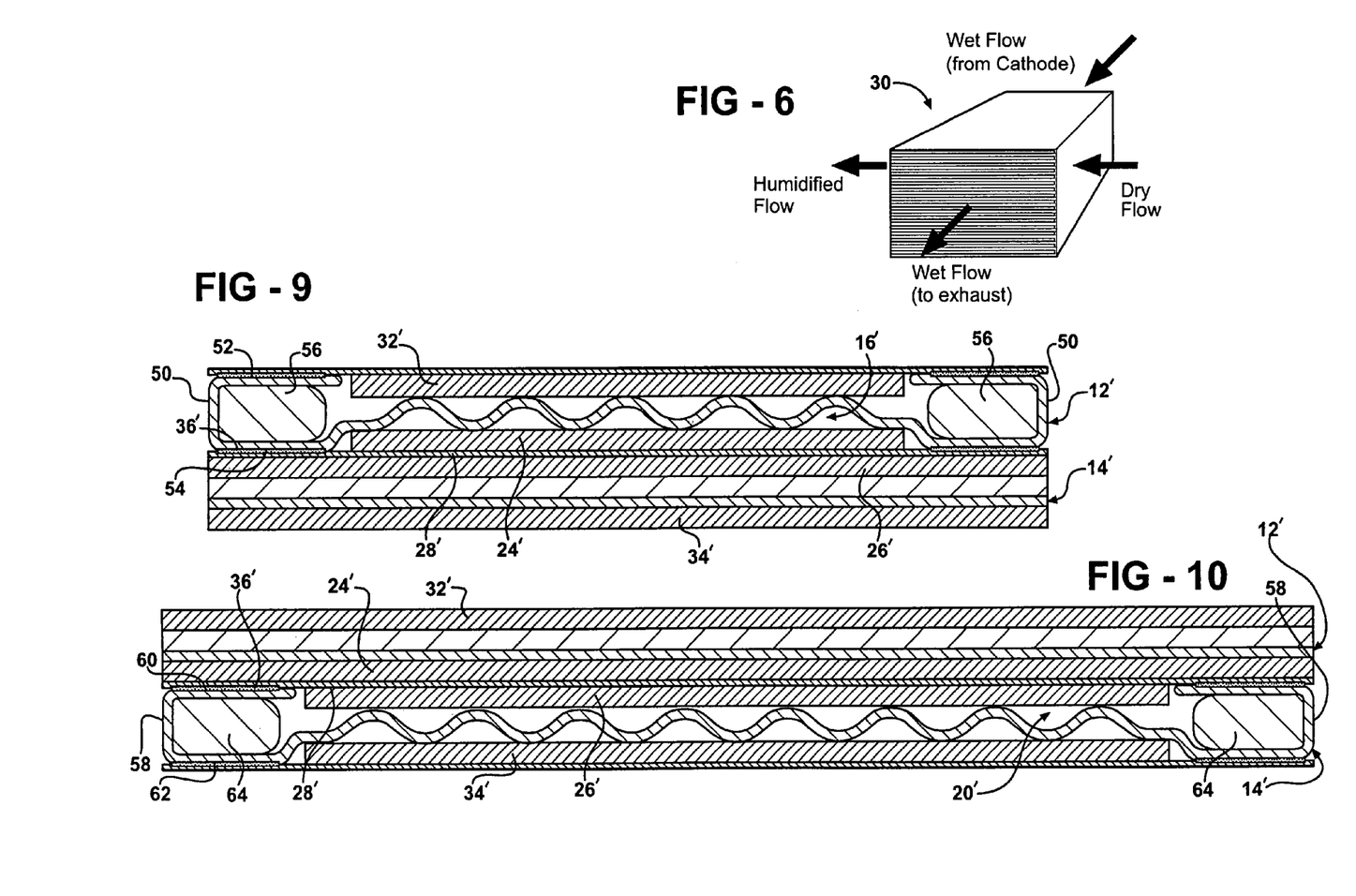
FIG. 6 is a perspective view of a plurality of stacked membrane humidifier assemblies.
FIG. 9 is a sectional view of a membrane humidifier assembly according to another embodiment of the invention and showing flow channels formed in a wet plate.
FIG. 10 is a sectional view of a membrane humidifier assembly according to another embodiment of the invention and showing flow channels formed in a dry plate.

FIG. 3 shows an exploded view of the membrane humidifier assembly 10 illustrated in FIG. 1, and FIG. 4 illustrates the membrane humidifier assembly 10 assembled. As more clearly illustrated in FIG. 5, the wet side plate 12 includes channels 16 formed on both a top side and a bottom side thereof. Similarly, the dry side plate 14 includes channels 20 formed on a top side and a bottom side thereof. Forming the channels 16, 20 on the top side and the bottom side of the plates 12, 14 permits a stacking of the plates 12, 14 into a water vapor transfer (WVT) unit 30, as shown in FIG. 6. In the embodiment shown, an additional diffusion medium 32 is disposed on the wet side plate 12 and a diffusion medium 34 is disposed adjacent the dry side plate 14 to facilitate stacking into the WVT unit 30. Additionally, diffusion media material can be used only surrounding the wet side plate 12 or the dry side plate 14, as desired. It is understood that other configurations for the diffusion media can be used without departing from the scope and spirit of the invention. In the embodiment shown, the membrane 28 is wrapped around the diffusion medium 32, the wet side plate 12, and the diffusion medium 24, although it is understood the membrane 28 can be otherwise disposed on or around the diffusion medium 32, the wet side plate 12, and the diffusion medium 24.

Figure 7:
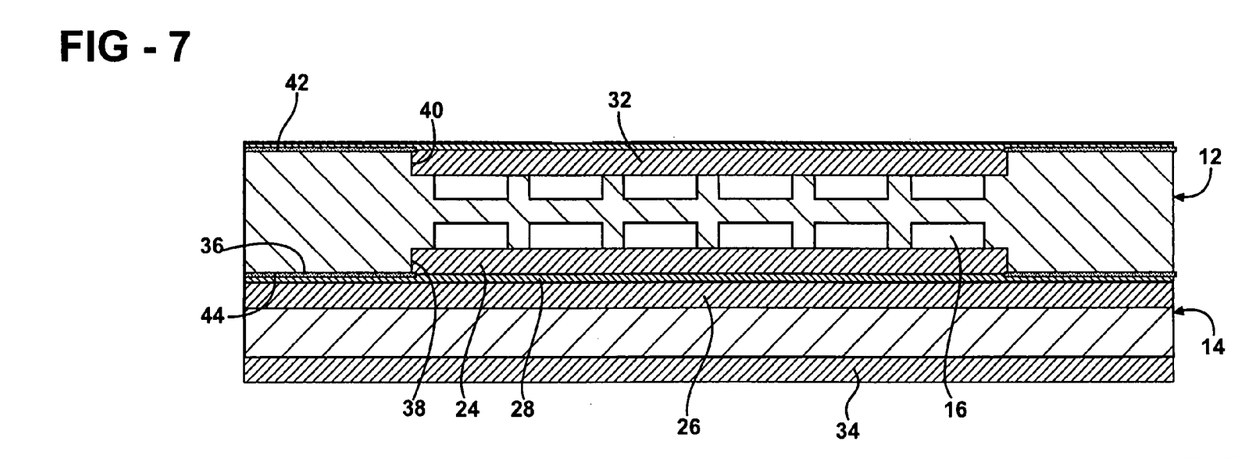
FIG. 7 is a sectional view of the membrane humidifier assembly taken along line 7-7 of FIG. 4 and showing flow channels formed in a wet plate.
Figure 8:
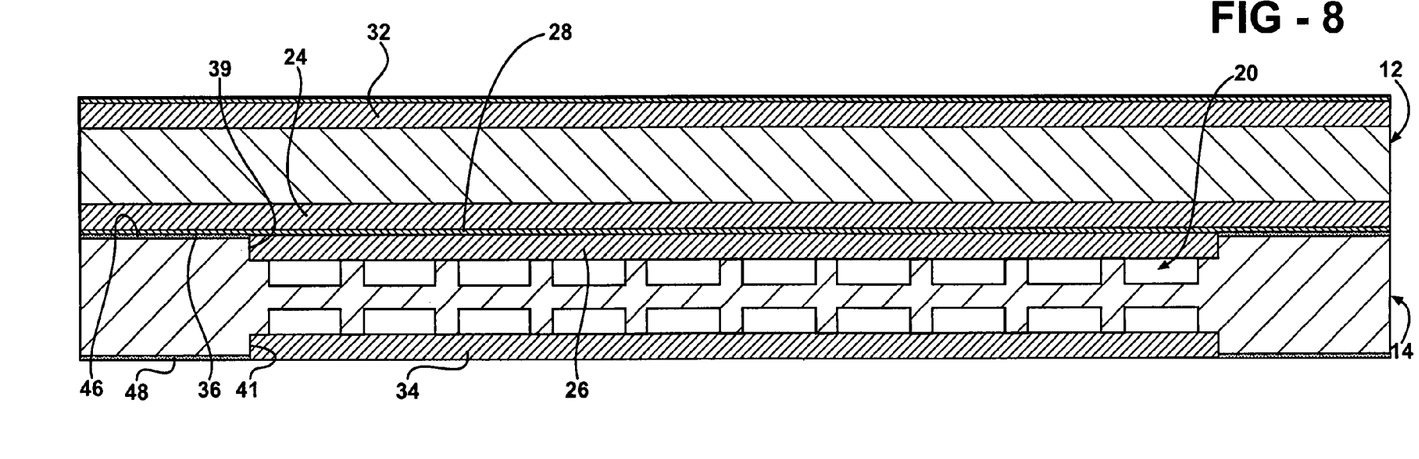
FIG. 8 is a sectional view of the membrane humidifier assembly taken along line 8-8 of FIG. 4 and showing flow channels formed in a dry plate.

FIGS. 7 and 8 show a sectional view of the wet side plate 12 and the dry side plate 14, and a cross-flow configuration for the channels 16, 20 of the respective plates 12, 14. In the embodiment shown, the membrane 28 is adhered to the plates 12, 14 by an adhesive material 36 at an outer peripheral edge of the plates 12, 14 to maximize sealing properties therebetween. It is understood that other conventional materials can be used such as a gasket or other seal, or that no seal or adhesive may be used if desired.

The diffusion media 24, 32 are disposed in respective cavities 38, 40 formed in the wet side plate 12. Cavities 39, 41 are also formed in the dry side plate 14 to receive the diffusion media 26, 34. It is understood that the diffusion media 24, 26, 32, 34 can extend to the outer peripheral edge of the plates 12, 14 without departing from the scope and spirit of the invention. Substantially flat sealing surfaces 42, 44, 46, 48 adjacent the respective outer peripheral edges of the plates 12, 14 further promote sealing between the plates 12, 14.

In the embodiment illustrated in FIGS. 7 and 8, the plates 12, 14 are formed by an extrusion process, although other processes can be used to form the plates 12, 14 as desired. Favorable results have been obtained for depths $H_{CW}$, $H_{CD}$ of the channels 16, 20 of less than or equal to 0.5 mm, although other depths $H_{CW}$, $H_{CD}$ can be used as desired. More favorable results have been obtained for depths $H_{CW}$, $H_{CD}$, of the channels 16, 20 of about 0.3 mm. Using channel depths in this range involves balancing the transport resistance in the channels 16, 20 and the channel pressure drop. As the channel depth is reduced, mass transport resistance in the channel is reduced. However the channel pressure drop is increased, which reduces the fuel cell efficiency. Depths $H_{CW}$, $H_{CD}$ within the ranges above have resulted in total pressure drops in the wet side channel 16 and the dry side channel 20 of less than 30 kPa for a 100 kWe fuel cell system.

A channel area ratio AR is defined by the following equation:

$$ARc = \frac{W_C}{W_C + W_L}$$

Favorable results have been found for channel area ratios AR in the range of 75-85% with a channel width $W_c$ of between 0.5 mm and 5 mm, although other ratio AR and channel widths $W_c$ can be used as desired. Such channel area ratios AR and channel widths $W_c$ are chosen to maximize a membrane area utilization under the lands 18, 22 and minimize the intrusion of the membrane 28 or other structures into the flow channels 16, 20. Additional favorable results have been obtained wherein a flow of gas through the channels 16, 20 is laminar, which minimizes a pressure drop through the channels 16, 20 and maximizes the water vapor transport through the diffusion media 24, 26, 32, 34 and the membrane 28. However, turbulent flow can be provided if desired. Use of the cross-flow configuration as disclosed in FIGS. 7 and 8 minimizes a pressure drop through the channels 16, 20 by maintaining a substantially linear flow path through the respective plates 12, 14, minimizes packaging size for the stack 30, and simplifies supply requirements for the gas, which will be further described herein. Further favorable results have been found where the diffusion media 24, 26, 32, 34 has a thickness of less than 0.2 mm, and typically between 0.05 and 0.15 mm, and a porosity in the range of 50-95%, and typically between 79 and 90%, although other thicknesses and porosities can be used as desired. Use of the diffusion media 24, 26, 32, 34 in the ranges listed promotes efficient use of the areas of the membrane 28 adjacent the lands 18, 22, and minimizes mass transport resistance in the diffusion media 24, 26, 32, 34. When optimizing water vapor transport through the diffusion media 24, 26, 32, 34, favorable results have been found using a pore size in the diffusion media 24, 26, 32, 34 in the range of about 0.01-100 micrometers, and typically between 1 and 50 micrometers, although other pore sizes can be used as desired. To militate against intrusion of the diffusion media 24, 26, 32, 34 into the channels 16, 20, which results in higher pressure drops in the channels 16, 20, it is desirable for the diffusion media 24, 26, 32, 34 to have a modulus of elasticity larger than 40,000 kPa, and more desirable to for the modulus to be larger than 100,000 kPa.

In operation, the wet gas is caused to flow through the channels 16 formed in the wet side plate 12. The wet gas is received from the supply of wet gas. Any convention means can be used to deliver the wet gas to the channels 16 such as a supply header in communication with the channels 16, for example. In the embodiment shown, the wet gas is supplied from an exhaust stream of the fuel cell. The wet gas exits the channels 16 to the exhaust. The dry gas is caused to flow through the channels 20 formed in the dry side plate 14. The dry gas is received from the supply of dry gas. Any conventional means can be used to deliver the dry gas to the channels 20 such as a supply header in communication with the channels 20, for example. The dry gas then exits the channels 20. In the embodiment shown, the dry gas is supplied from a compressor (not shown).

A temperature of the wet gas is typically lower than a temperature of the dry gas for the embodiment shown. The temperature of the dry air from the compressor may be about 180 degrees Celsius, and the temperature of the wet air from the fuel cell exhaust may be about 80-95 degrees Celsius. If an air cooler (not shown) is used to cool the dry air supplied from the compressor, the temperature may be in the range of 95-105 degrees Celsius. It is understood that other temperature ranges can be used without departing from the scope and spirit of the invention. As a result of the temperature difference between the wet gas and the dry gas, the dry gas is also cooled during the humidification thereof. The cooling effect also increases the relative humidity of the newly humidified gas (the dry gas), thus minimizing a drying effect of the gas on components of the fuel cell.

During flow of the wet gas through the channels 16 and the flow of the dry gas through the channels 20, the wet gas is in cross flow with the dry gas. It is understood that a counterflow of the gas streams can also be used to facilitate a transport of water vapor from wet gas stream to the dry gas stream. For a fuel cell humidification application, the water transfer effectiveness requirement is typically low. As a result, there is little expected performance difference between counter-flow and cross-flow design. The water molecular transport from the wet gas to the dry gas can involve the following modes: A) convection mass transport of water vapor in the channels 16, 20; B) diffusion transport through the diffusion media 24, 26, 32, 34; and C) water vapor transport through the membrane 28 by diffusion. Additionally, if a pressure differential exists between the channels 16 in the wet side plate 12 and the channels 20 in the dry side plate 14, water is transferred through the membrane 28 by hydraulic forces. In addition, if the wet gas stream and the dry gas stream are at different temperatures, heat transfer from the hot fluid to the membrane 28 and from the membrane 28 to the cold fluid may also impact transfer of water. Water may also condense or vaporize in the bulk phases (i.e. either fluid may contain entrained liquid water at RH>100%). An enthalpy exchange may also be present between the wet gas and the dry gas associated with water flux.

As previously indicated, the plates 12, 14 are formed by an extrusion process. By forming the plates 12, 14 in this way, a complexity of manufacturing is minimized. Due to the minimized complexity of manufacturing, the cost thereof is also minimized.

FIGS. 9 and 10 illustrate another embodiment of the invention. Like structure repeated from FIGS. 1-8 is depicted using the same reference numeral and a prime (') symbol. In the embodiment shown, the plates 12', 14' are formed by a stamping process resulting in the shape of channels shown, although other processes can be used to form the plates 12', 14' as desired.

The wet side plate 12' includes a folded edge 50. The folded edge 50 includes substantially flat sealing surfaces 52, 54. In the embodiment shown, the folded edge 50 includes a filler 56 disposed therein adapted to militate against a bypass of gas flow therethrough. It is understood that the folded edge 50 can be completely filled with the filler 56, partially filled with the filler 56, or be provided without the filler 56 as desired.

The dry side plate 14' includes a folded edge 58. The folded edge 58 includes substantially flat sealing surfaces 60, 62. It is understood that the folded edge 58 can be provided with a filler 64 which completely fills the folded edge 58, partially fills the folded edge 58, or the folded edge 58 can be provided without the filler as shown.

Use of the wet side plate 12' and the dry side plate 14' formed by the stamping process further minimizes a thickness of the plates 12', 14'. By forming the plates 12', 14' in this way, a complexity of manufacturing is minimized. Due to the minimized complexity of manufacturing, the cost thereof is also minimized. The remainder of the structure and operation are substantially the same as described above for FIGS. 1-8.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A membrane humidifier for a fuel cell comprising:
   a substantially planar first plate having a plurality of substantially linear flow channels formed therein, the flow channels of said first plate adapted to facilitate a flow of a first gas therethrough, the flow channels formed on both a top side and a bottom side of said first plate;
   a substantially planar second plate having a plurality of substantially linear flow channels formed therein, the flow channels of said second plate adapted to facilitate a flow of a second gas therethrough, the flow channels formed on both a top side and a bottom side of said second plate, wherein the flow channels of said first plate are substantially perpendicular to the flow channels of said second plate;
   a diffusion medium disposed between said first plate and said second plate, said diffusion medium adapted to permit a transfer of water vapor therethrough; and
   a membrane disposed between said first plate and said second plate, said membrane adapted to permit a transfer of water vapor therethrough, wherein said diffusion medium abuts the membrane and one of said first plate and said second plate, and wherein water vapor in the first gas is transferred through said diffusion medium and said membrane to the second gas.

2. The humidifier according to claim 1, wherein at least one of the first gas and the second gas are at are selected from air and gas mixtures including at least one $O_2$, $N_2$, $H_2O$, $H_2$.

3. The humidifier according to claim 1, wherein said membrane has a permeance of greater than 8000 GPU.

4. The humidifier according to claim 1, wherein said first plate and said second plate include a substantially flat sealing surface adjacent a peripheral edge thereof.

5. The humidifier according to claim 1, wherein said first plate and said second plate have a folded outer edge.

6. The humidifier according to claim 5, wherein at least one of the folded outer edge of said first plate and the folded outer edge of said second plate includes a filler disposed therein.

7. The humidifier according to claim 1, wherein said first plate and said second plate are formed by a stamping process.

8. The humidifier according to claim 1, wherein said first plate and said second plate are formed by an extrusion process.

9. The humidifier according to claim 1, wherein at least one of the channels of said first plate and the channels of said second plate have a depth of up to 0.5 millimeters.

10. The humidifier according to claim 1, wherein at least one of the channels of said first plate and the channels of said second plate have a depth of about 0.3 millimeters.

11. The humidifier according to claim 1, wherein a total pressure drop in the channel of said first plate and the channel of said second plate is less than 30 kilopascals for a 100 kWe fuel cell system.

12. The humidifier according to claim 1, wherein a channel area ratio for at least one of the channels of said first plate and the channels of said second plate defined by the equation $$ChannelAreaRatio = \frac{WidthoftheChannel}{WidthoftheChannel + WidthoftheLand}$$

is in the range of 75-85%.

13. The humidifier according to claim 1, wherein the flow of at least one of the first gas and the second gas is laminar.

14. The humidifier according to claim 1, wherein a temperature of the first gas is lower than a temperature of the second gas, causing a cooling of the second gas during the humidification thereof.

15. The humidifier according to claim 1, wherein said diffusion medium has a thickness of less than 0.2 mm, a porosity in the range of 50-95%, an average pore size in the range of 0.01 to 100 micrometer, and a modulus of elasticity larger than 40,000 kPa.

* * * * *